United States Patent [19]

Bond

[11] Patent Number: 5,550,759
[45] Date of Patent: Aug. 27, 1996

[54] ADAPTIVE PARAMETER KERNEL PROCESSOR

[75] Inventor: James W. Bond, Schlosser; Thomas W., both of San Diego, Calif.

[73] Assignee: The United States of America as represented by the Secretary of the Navy, Washington, D.C.

[21] Appl. No.: 511,675

[22] Filed: Aug. 7, 1995

Related U.S. Application Data

[63] Continuation of Ser. No. 707,352, May 29, 1991, Pat. No. 5,517,531, Ser. No. 707,354, May 29, 1991, Pat. No. 5,499, 399, Ser. No. 713,659, Jun. 11, 1991, Pat. No. 5,509,032, Ser. No. 713,660, Jun. 11, 1991, Ser. No. 766,618, Sep. 25, 1991, Pat. No. 5,495,497, and Ser. No. 766,605, Sep. 26, 1991, Pat. No. 5,495,496.

[51] Int. Cl.$^6$ .................................................. H04B 15/00
[52] U.S. Cl. ........................... 364/574; 364/572; 375/200; 375/285; 375/346; 455/296
[58] Field of Search ............................ 375/346, 350, 375/278, 284, 285, 200; 455/296, 307, 310; 364/157, 574, 572, 179

[56] References Cited

U.S. PATENT DOCUMENTS

| | | | |
|---|---|---|---|
| 4,028,697 | 6/1977 | Albanese et al. | 364/574 |
| 4,408,332 | 10/1983 | Sari | 375/346 |
| 4,578,747 | 3/1986 | Hideg et al. | 364/157 |
| 4,587,620 | 5/1986 | Niimi et al. | 364/574 |
| 4,682,230 | 7/1987 | Perlman et al. | 455/307 |
| 5,018,088 | 5/1991 | Higbie | 364/574 |
| 5,029,118 | 7/1991 | Nakajima et al. | 364/574 |
| 5,121,364 | 6/1992 | O'Donnell | 367/98 |
| 5,187,692 | 2/1993 | Haneda et al. | 367/135 |
| 5,208,786 | 5/1993 | Weinstein et al. | 367/124 |
| 5,241,320 | 8/1993 | Mizoguchi | 342/362 |
| 5,278,777 | 1/1994 | Cummins | 364/574 |
| 5,289,194 | 2/1994 | Schlosser | 342/378 |

OTHER PUBLICATIONS

Bond et al., "Adaptive Locally Optimum Detection Based Upon Kernel Estimation", NOSC Technical Report 1307, Aug. 1989, pp. 1–19.

*Primary Examiner*—James P. Trammell
*Assistant Examiner*—Eric W. Stamber
*Attorney, Agent, or Firm*—Harvey Fendelman; Michael A. Kagan; Eric James Whitesell

[57] ABSTRACT

The adaptive parameter kernel processor of the present invention uses an adaptive locally optimum detection (ALOD) signal processing algorithm to suppress interfering signals in a communications signal. The adaptive parameter kernel processor generates a signal magnitude value for each signal sample, partitions the signal magnitude values into sets, and concurrently executes multiple copies of the ALOD signal processing algorithm. Each copy of the signal processing algorithm applies a probability density function to the sets of signal magnitude values, generating a gain factor for each set. The probability density function includes a parameter that has a different value in each copy of the signal processing algorithm. Each copy of the signal processing algorithm generates an average gain factor associated with the corresponding parameter value. The parameter values are updated respectively in the multiple copies of the signal processing algorithm by a parameter comparator to cause the parameter value associated with the minimum average gain factor to approach the midpoint of the parameter values. An output signal is formed from the signal samples and an arithmetic function of the average gain factor associated with the midpoint of the parameter values.

16 Claims, 4 Drawing Sheets

ADAPTIVE PARAMETER KERNEL PROCESSOR

CROSS-REFERENCE TO RELATED APPLICATIONS

This application is a continuation under 37 CFR 1.53 of the following patent applications:

KERNEL ADAPTIVE INTERFERENCE SUPPRESSION SYSTEM, Ser. No. 07/707,352, filed May 29, 1991, now U.S. Pat. No. 5,517,531;

TWO-DIMENSIONAL KERNEL ADAPTIVE INTERFERENCE SUPPRESSION SYSTEM, Ser. No. 07/707,354, filed May 29, 1991, now U.S. Pat. No. 5,499,399;

NON-ADAPTIVE AMPLITUDE-DIFFERENCE INTERFERENCE FILTER, Ser. No. 07/713,659, filed Jun. 11, 1991, now U.S. Pat. No. 5,509,032;

NON-ADAPTIVE PHASE-DIFFERENCE INTERFERENCE FILTER, Ser. No. 07/713,660, filed Jun. 11, 1991;

METHOD AND APPARATUS FOR SUPPRESSING INTERFERENCE FROM BANDSPREAD COMMUNICATION SIGNALS, Ser. No. 07/766,618, filed Sep. 25, 1991, now U.S. Pat. No. 5,495,497; and METHOD AND APPARATUS FOR SUPPRESSING LINEAR AMPLITUDE NTERFERENCE FROM BANDSPREAD COMMUNICATION SIGNALS, Ser. No. 07/766,605, filed Sep. 26, 1991, now U.S. Pat. No. 5,495,496.

BACKGROUND OF THE INVENTION

The adaptive parameter kernel processor relates generally to enhancing the signal-to-noise ratio of communication signals. More particularly, the present invention relates to statistical evaluation techniques incorporating probability density functions to suppress interference in communications signals.

Radios may receive combinations of three forms of signals: noise, interference and communications. Noise, created in the atmosphere due to natural causes such as lightning and the like, is unpredictable. Interference signals can be caused inadvertently, such as by several stations broadcasting within the same band, or can be caused deliberately, such as by an adversary transmitting signals to mask communications signals.

Many major sources of signal interference are non-Gaussian in structure. One technique for detecting communications signals in the presence of non-Gaussian interference employs algorithms that estimate the statistics of the interference. This estimate is then used to improve the signal-to-noise ratio of the received signals.

One estimation technique utilizes a probability density function (PDF) to generate a gain factor from samples of a signal magnitude, such as amplitude or phase. Adaptive Locally Optimum Detection (ALOD) algorithms incorporate PDFs to suppress interference, but have the disadvantage that no fixed set of PDF parameter values is optimum for all signal environments. There is thus a need for an interference suppression system that can optimize the PDF parameter values in any signal environment.

SUMMARY OF THE INVENTION

The adaptive parameter kernel processor of the present invention addresses the problems described above and may provide further related advantages.

The adaptive parameter kernel processor uses an adaptive locally optimum detection (ALOD) signal processing algorithm to suppress interfering signals in a communications signal. The adaptive parameter kernel processor generates a signal magnitude value for each signal sample, partitions the signal magnitude values into sets, and concurrently executes multiple copies of the ALOD signal processing algorithm. Each copy of the signal processing algorithm applies a probability density function to the sets of signal magnitude values, generating a gain factor for each set. The probability density function includes a parameter that has a different value in each copy of the signal processing algorithm. Each copy of the signal processing algorithm generates an average gain factor associated with the corresponding parameter value.

The parameter values are updated respectively in the multiple copies of the signal processing algorithm by a parameter comparator to cause the parameter value associated with the minimum average gain factor to approach the midpoint of the parameter values. An output signal is formed from the signal samples and an arithmetic function of the average gain factor associated with the midpoint of the parameter values.

Other objects, advantages and new features of the invention will become apparent from the following detailed description of the invention when considered in conjunction with the accompanying drawings.

DESCRIPTION OF THE INVENTION

Figure 1:
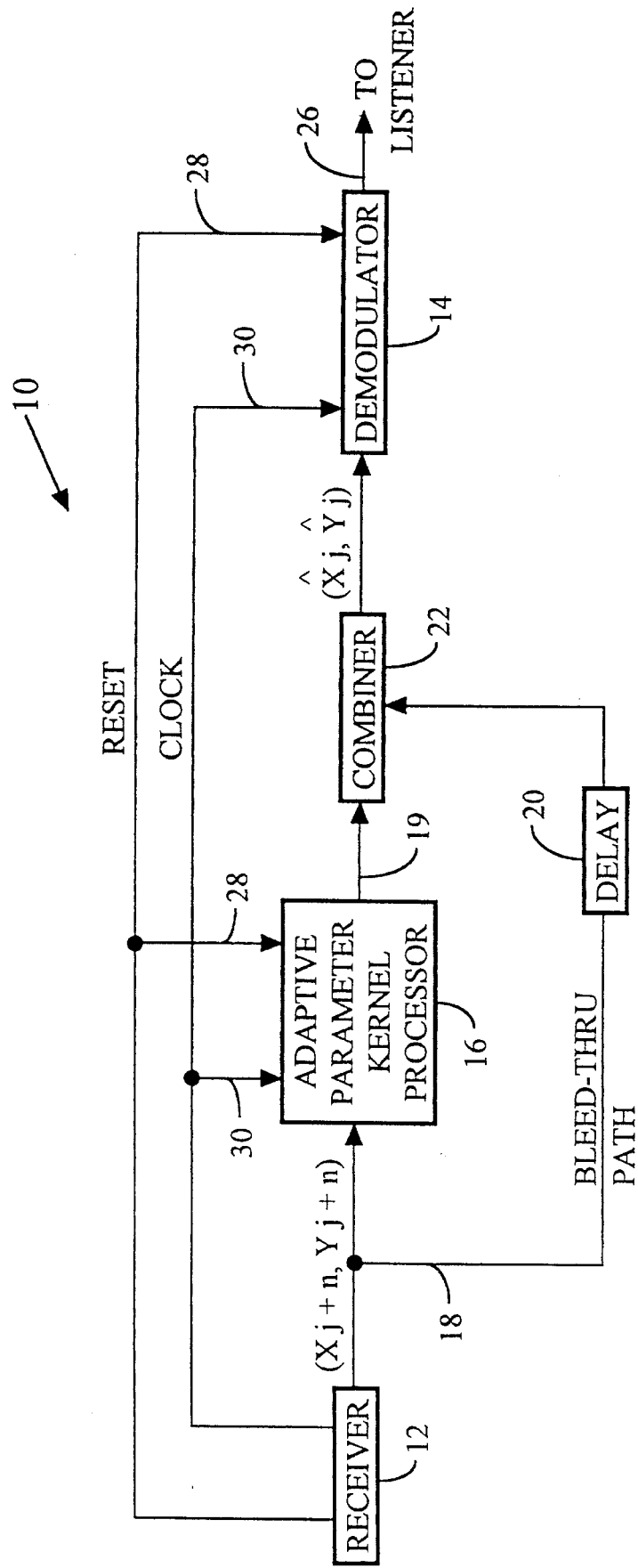
FIG. 1 is a block diagram of the adaptive parameter kernel processor of the present invention in an interference suppression system.

FIG. 1 is a block diagram of an embodiment of an adaptive parameter kernel processor 16 in a communications signal interference suppression system 10. Communications signal interference suppression system 10 comprises a receiver 12, a bleed-through path 18, a delay 20, a combiner 22, and a demodulator 14, which are synchronized to processor 16 by a reset signal 28 and a clock signal 30. Receiver 12, bleed-through path 18, delay 20, combiner 22, and demodulator 14 may be constructed and operated as described in COMBINER FOR TWO-DIMENSIONAL ADAPTIVE INTERFERENCE SUPPRESSION SYSTEM, U.S. Pat. No. 5,289,194, issued Feb. 22, 1994 and incorporated herein by reference thereto. Processor 16 inputs a signal vector $<x_{j+n}, y_{j+n}>$ from receiver 12 and has an output 19 connected to combiner 22. Processor 16 may execute an adaptive locally optimum processing algorithm 200 as shown in FIG. 2.

Figure 2:
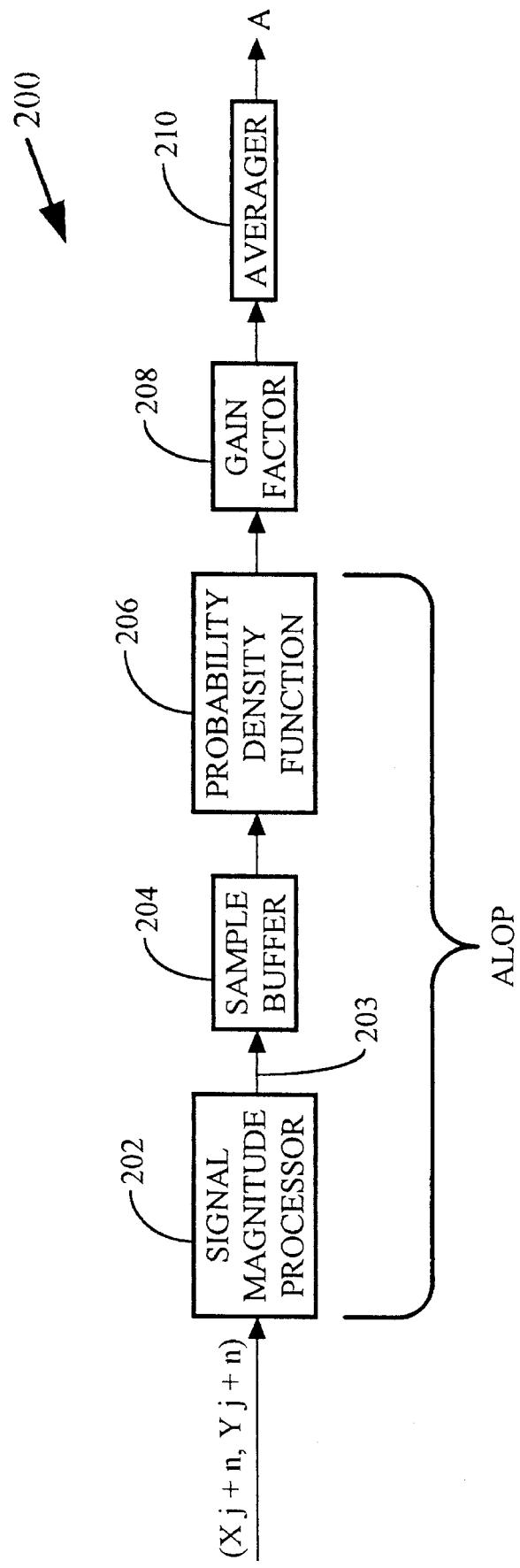
FIG. 2 is a block diagram of an adaptive locally optimum processing algorithm.

In FIG. 2, a signal magnitude processor 202 generates magnitude samples 203 from either the amplitude or the phase of input signal vector $<x_{j+n}, y_{j+n}>$. A sample buffer 204 partitions magnitude samples 203 into sets, each set comprising $(2N+1)$ of magnitude samples 203, where parameter N is a positive integer. A probability density function 206 is applied to each set of magnitude samples 203 to output a gain factor 208 for each set. Probability density function 206 may be, for example:

$$GF(x_0, x_j) = (x_0 - x_j) e^{-(x_0 - x_j)^2 / 2w\sigma^2}$$

where GF is gain factor 208, $X_j$ is the jth sample in buffer 204 centered at j=0, $\sigma^2$ is the variance of magnitude samples 203 in buffer 204, and parameter w is the window width of probability density function 206. An averager 210 averages gain factors 208 over sets of magnitude samples 203 from sample buffer 204. Signal magnitude processor 202, sample buffer 204, and probability density function 206 comprise an adaptive locally optimum processor (ALOP).

Figure 3:
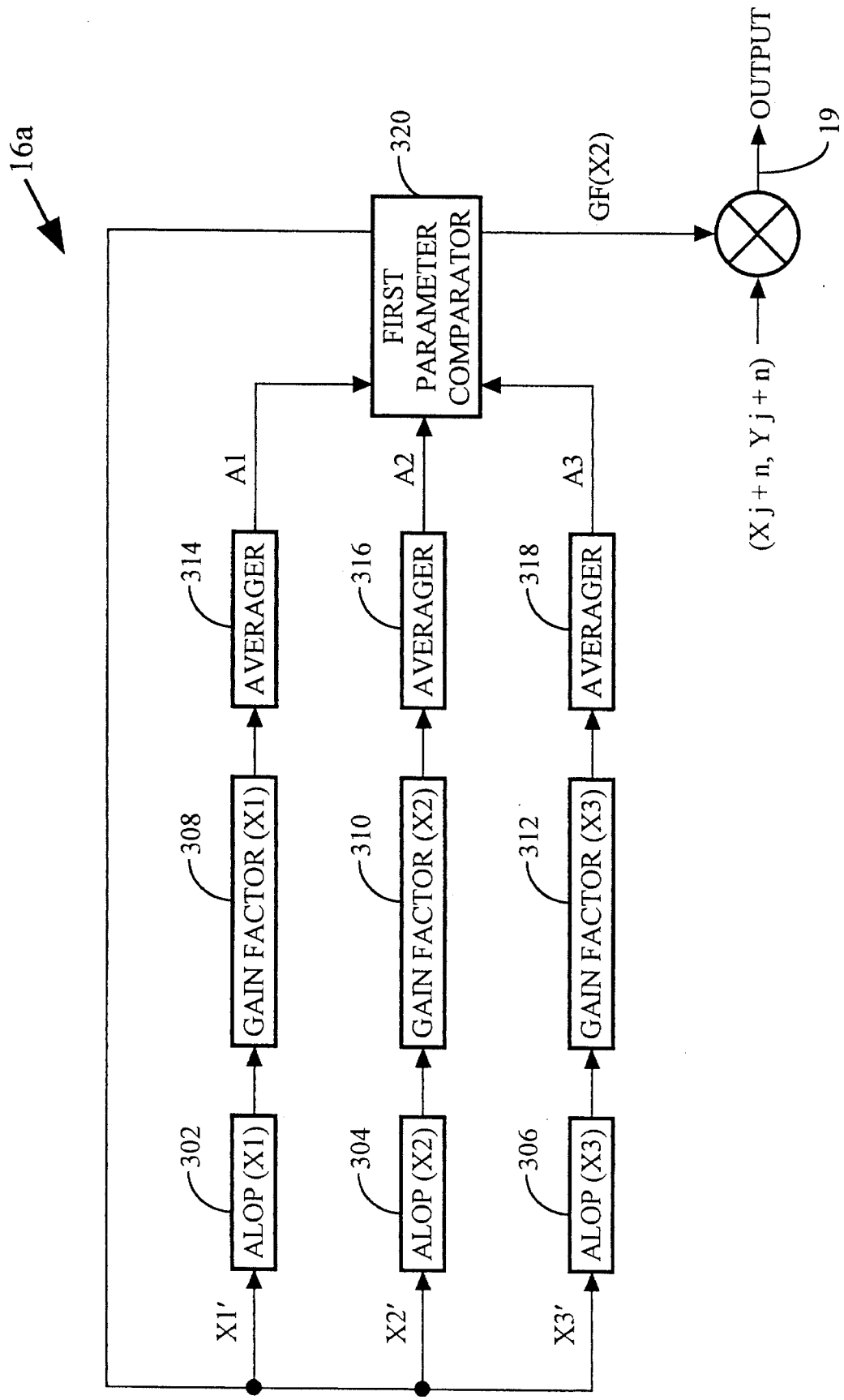
FIG. 3 is a block diagram of the adaptive parameter kernel processor with a single parameter.

FIG. 3 is a block diagram of an adaptive parameter kernel processor 16a with a single parameter X. Processor 16a comprises three adaptive locally optimum processors (ALOP) 302, 304, and 306 executing concurrently to generate gain factors 308, 310, and 312. Initial values X1, X2, and X3 are chosen for parameter X, where X1<X2<X3. Gain factors 308, 310, and 312 are continuously averaged by averagers 314, 316, and 318, respectively. A number M of gain factors 308, 310, and 312 are averaged by averagers 314, 316, and 318, respectively. M may be, for example, 100. Averagers 314, 316, and 318 generate average gain factors A1, A2, and A3. A first parameter comparator 320 then performs the following operation on average gain factors A1, A2, and A3:

If A1 is the smallest of A1, A2, and A3, then parameters X1, X2, and X3 are decremented to form updated parameter values X1', X2', and X3'.

If A2 is the smallest of A1, A2, and A3, then parameters X1, X2, and X3 are left unchanged to form updated parameter values X1', X2', and X3'.

If A3 is the smallest of A1, A2, and A3, then parameters X1, X2, and X3 are incremented to form updated parameter values X1', X2', and X3'.

Updated parameter values X1', X2', and X3' are then fed back to corresponding ALOP'S 302, 304, and 306. A1, A2, and A3 are then reset to zero, and another M gain factors 308, 310, and 312 are averaged. First parameter comparator 320 thus operates to keep the minimum of average gain factors A1, A2, and A3 centered around X2, the midpoint of parameter values X1, X2, and X3. Gain factor 310 is applied to input communications signal vector $\langle x_{j+n}, y_{j+n} \rangle$, typically by a multiplying function, to form output 19 for combiner 22 of FIG. 1. First parameter comparator 320 may also incorporate thresholds to prevent parameters X1, X2, and X3 from being reduced or increased beyond a desired range. A parameter increase or decrease may coveniently be implemented as a multiply or divide by a power of two, respectively.

Figure 4:
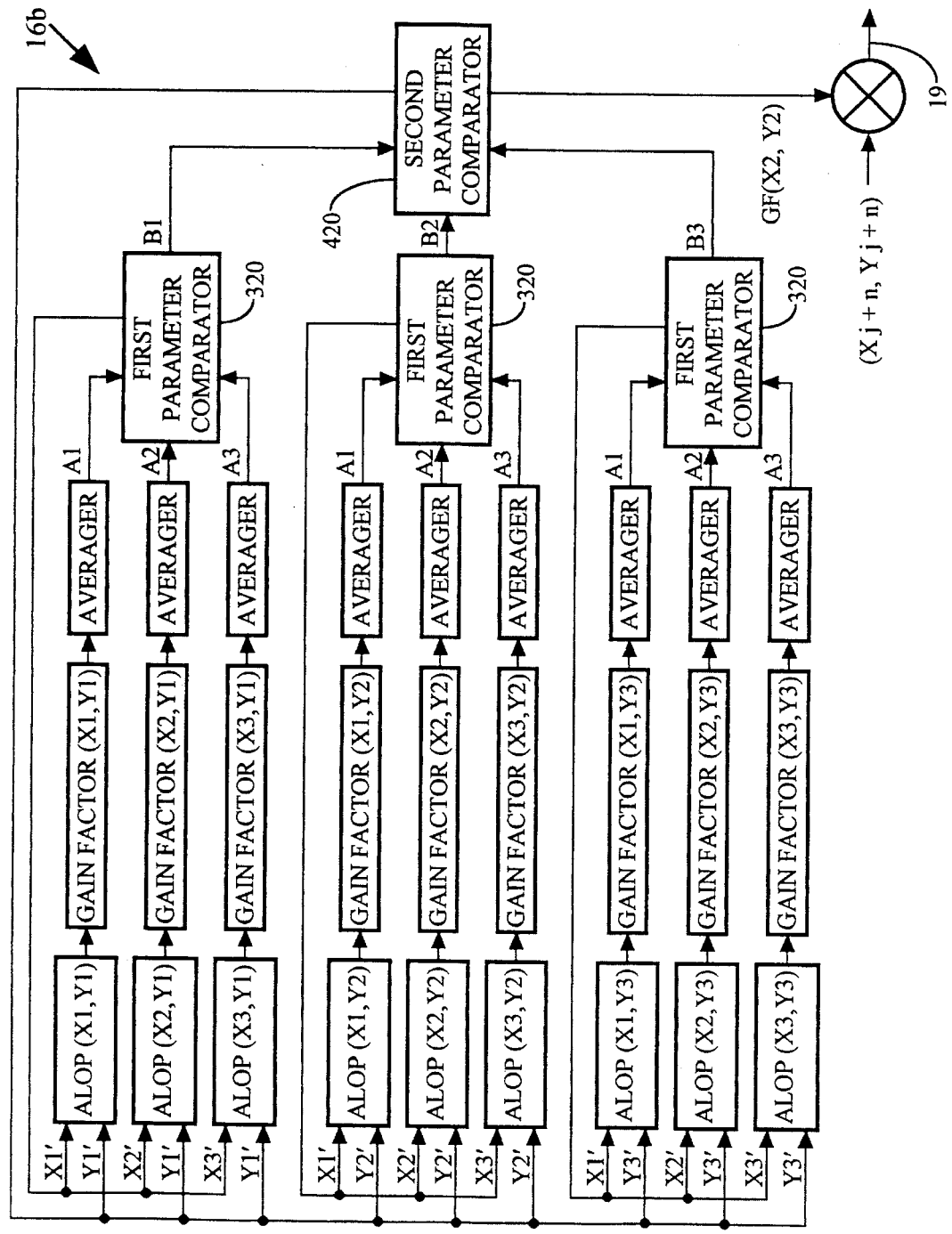
FIG. 4 is a block diagram of the adaptive parameter kernel processor with two parameters.

FIG. 4 is a block diagram of an adaptive parameter kernel processor 16b with two parameters. Processor 16b comprises three processors 16a as described in FIG. 3 executing concurrently, one for each of three values Y1, Y2, and Y3 of a second parameter Y. Initial values Y1, Y2, and Y3 are chosen for second parameter Y, where Y1<Y2<Y3. The minimum average gain factor from each first parameter comparator 320 are input to a second parameter comparator 420 as B1, B2, and B3. Second parameter comparator 402 performs the following operation:

If average B1 is the smallest of minimum average gain factors B1, B2, and B3, then parameters Y1, Y2, and Y3 are decremented to form updated parameter values Y1', Y2', and Y3'.

If average B2 is the smallest of minimum average gain factors B1, B2, and B3, then parameters Y1, Y2, and Y3 are left unchanged to form updated parameter values Y1', Y2', and Y3'.

If average B3 is the smallest of minimum gain factors B1, B2, and B3, then parameters Y1, Y2, and Y3 are incremented to form updated parameter values Y1', Y2', and Y3'.

Updated parameter values Y1', Y2', and Y3' are then fed back to the ALOP's respectively as shown in FIG. 4. Average gain outputs B1, B2, and B3 are then reset to zero, and another M gain factors are averaged for each combination of X and Y parameter values. Second parameter comparator 420 thus operates to keep the minimum of the average gain factors for X and Y centered at (X2,Y2), the midpoint of parameter values X and Y. The gain factor corresponding to (X2,Y2) is applied to input communications signal vector $\langle x_{j+n}, y_{j+n} \rangle$, typically by a multiplying function, to form output 19 for combiner 22 of FIG. 1. Second parameter comparator 420 may also incorporate thresholds to prevent parameters Y1, Y2, and Y3 from being reduced or increased beyond a desired range.

Exemplary initial values for X=N are X1=4, X2=8, X3=16, minimum threshold=2, maximum threshold=64. Exemplary initial values for Y=w are Y1=1, Y2=2, Y3=4, minimum threshold=0.13, maximum threshold=6.

Other modifications, variations, and applications of the present invention may be made in accordance with the above teachings other than as specifically described to practice the invention within the scope of the following claims.

We claim:

1. A method for processing signal samples comprising the steps of:

generating a signal magnitude value for each of said signal samples;

concurrently executing multiple copies of a signal processing algorithm in at least one processor, said signal processing algorithm comprising the steps of:
partitioning said signal magnitude values into sets;
applying a probability density function to said signal magnitude values to generate gain factors for said sets, wherein said probability density function includes a parameter; and
averaging said gain factors to form an average gain factor associated with a value of said parameter;

finding said value of said parameter associated with a minimum of said average gain factors;

updating said values of said parameter in said multiple copies of said signal processing algorithm so that said value of said parameter associated with said minimum approaches a midpoint of said values of said parameter;

forming an output signal from an arithmetic function of said signal samples and said average gain factor associated with said midpoint value of said parameter; and updating said values of said parameter as follows:

if said minimum is associated with a smallest of said values of said parameter, then said values are decremented; or if said minimum is associated with a midpoint of said values of said parameter, then said values are unchanged; or if said minimum is associated with a largest of said values of said parameter, then said values are incremented.

2. The method of claim 1, wherein said multiple copies of said signal processing algorithm number three.

3. The method of claim 1, wherein said signal magnitude is an amplitude magnitude.

4. The method of claim 1, wherein said signal magnitude is a phase magnitude.

5. The method of claim 1, wherein said parameter is a function of number of samples in each of said sets.

6. The method of claim 1, wherein said parameter is a function of window width in said probability density function.

7. The method of claim 1, wherein said probability density function includes multiple parameters.

8. The method of claim 7, wherein one of said multiple parameters is a function of number of samples in each of said sets, and another of said multiple parameters is a function of window width in said probability density function.

9. The method of claim 1, wherein said arithmetic function comprises multiplication.

10. The method of claim 1, wherein decrementing said values comprises dividing said values by a power of two.

11. The method of claim 1, wherein incrementing said values comprises multiplying said values by a power of two.

12. The method of claim 1, wherein the step of decrementing said values is omitted if said smallest of said values is less than a smallest threshold, and wherein the step of incrementing said values is omitted if said largest of said values is greater than a largest threshold.

13. A signal processor for processing signal samples, comprising:

a signal processing algorithm;

a concurrent processor for concurrently executing multiple copies of said signal processing algorithm, said signal processing algorithm comprising the steps of:

generating sets of signal magnitude values from said signal samples;

applying a probability density function of said signal magnitude values to generate a gain factor for each of said sets, wherein said probability density function includes a parameter; and averaging said gain factors to generate an average gain factor associated with a value of said parameter;

a comparator for finding said value of said parameter associated with a minimum of said average gain factors, and for updating said values of said parameter in said multiple copies of said signal processing algorithm so that said value of said parameter associated with said minimum approaches a midpoint value of said parameter; and a multiplier for forming an output signal from an arithmetic function of said signal samples and said average gain factor associated with said midpoint value of said parameter, wherein said values of said parameter are updated as follows:

if said minimum is associated with a smallest of said values of said parameter, then said values are decremented; or if said minimum is associated with a midpoint of said values of said parameter, then said values are unchanged; or if said minimum is associated with a largest of said values of said parameter, then said values are incremented.

14. The signal processor of claim 13, wherein decrementing said values comprises dividing by a power of two.

15. The signal processor of claim 13, wherein incrementing said values comprises multiplying by a power of two.

16. The signal processor of claim 13, wherein the step of decrementing said values is omitted if said smallest value is less than a smallest threshold, and the step of incrementing said values is omitted if said largest value is greater than a largest threshold.

* * * * *